United States Patent
Brunner et al.

(10) Patent No.: US 10,622,119 B2
(45) Date of Patent: Apr. 14, 2020

(54) VISUALLY IDENTIFIABLE ELECTRICAL STRUCTURAL WIRING SYSTEM

(71) Applicant: NORTHERN CABLES INC., Brockville (CA)

(72) Inventors: Josef Brunner, Elizabethtown (CA); Shelley Bacon, Smith Falls (CA); Kevin Charlebois, Prescott (CA)

(73) Assignee: Northern Cables Inc., Brockville, Ontario (CA)

( * ) Notice: Subject to any disclaimer, the term of this patent is extended or adjusted under 35 U.S.C. 154(b) by 122 days.

(21) Appl. No.: 15/968,388

(22) Filed: May 1, 2018

(65) Prior Publication Data

US 2018/0247739 A1 Aug. 30, 2018

Related U.S. Application Data

(62) Division of application No. 14/397,727, filed as application No. PCT/CA2013/050316 on Apr. 25, 2013, now abandoned.

(Continued)

(51) Int. Cl.
*H01B 7/36* (2006.01)
*H01B 13/34* (2006.01)
(Continued)

(52) U.S. Cl.
CPC .......... *H01B 7/366* (2013.01); *F16L 11/1185* (2013.01); *H01B 13/342* (2013.01);
(Continued)

(58) Field of Classification Search
CPC .... H01B 7/366; H01B 13/342; H02G 3/0468; H02G 2200/20; F16L 11/1185; Y10T 156/10; Y10T 428/13; Y10T 428/24802
See application file for complete search history.

(56) References Cited

U.S. PATENT DOCUMENTS 3,628,271 A 12/1971 Carrell et al.
5,468,914 A * 11/1995 Falciglia ................ H01B 7/365
156/50

(Continued)

FOREIGN PATENT DOCUMENTS

CN 201886811 U 6/2011
EP 0 829 884 3/1998

OTHER PUBLICATIONS

The International Search Report for PCT/CA2013/050316 dated Aug. 6, 2013.

*Primary Examiner* — Yan Lan
(74) *Attorney, Agent, or Firm* — McDonnell Boehnen Hulbert & Berghoff LLP

(57) ABSTRACT

The present invention provides an identifiable armored cable sheath. In accordance with an aspect of the present invention, there is provided an identifiable armored cable sheath comprising: an armored cable sheath having an outer surface, and a visual indicia applied on the outer surface of the cable sheath in a patterned arrangement, wherein the visual indicia possesses visibility features in low light. Another aspect of the present invention provides a method of making an identifiable armored cable sheath comprising: providing an armored cable sheath, and applying a visually distinctive tape to the outer surface of the sheath in a patterned arrangement.

18 Claims, 7 Drawing Sheets

Related U.S. Application Data

(60) Provisional application No. 61/640,489, filed on Apr. 30, 2012.

(51) Int. Cl.
*F16L 11/118* (2006.01)
*H02G 3/04* (2006.01)

(52) U.S. Cl.
CPC ....... *H02G 3/0468* (2013.01); *H02G 2200/20* (2013.01); *Y10T 156/10* (2015.01); *Y10T 428/13* (2015.01); *Y10T 428/24802* (2015.01)

(56) References Cited

U.S. PATENT DOCUMENTS

| | | |
|---|---|---|
| 2009/0095398 A1 | 4/2009 | Hardin et al. |
| 2010/0255298 A1 | 10/2010 | Abe et al. |
| 2010/0283007 A1 | 11/2010 | Robinson |
| 2011/0114360 A1* | 5/2011 | Hermes .................... H01B 7/36 174/112 |

\* cited by examiner

Resistance of armor

| AWG size of circuit conductors | Maximum resistance in ohms per 100 feet | Maximum resistance in ohms per 75 meters |
| --- | --- | --- |
| 14 | 0.75 | 1.85 |
| 12 | 0.64 | 1.57 |
| 10 | 0.56 | 1.38 |
| 8 | 0.45 | 1.11 |
| 6 | 0.38 | 0.94 |
| 4 | 0.3 | 0.74 |

Figure 1

VISUALLY IDENTIFIABLE ELECTRICAL STRUCTURAL WIRING SYSTEM

This application is a divisional of U.S. patent application Ser. No. 14/397,727, filed on Oct. 29, 2014, which is a U.S. National Phase of International Application No. PCT/CA2013/050316, filed on Apr. 25, 2013, which claims priority to U.S. Provisional Application No. 61/640,489, filed Apr. 30, 2012, the disclosures of all of which are hereby incorporated by reference in their entireties.

FIELD OF THE INVENTION

The present invention pertains to the field of electrical structural wiring elements, and in particular to providing a visually distinctive armored cable sheaths with visibility features in low light.

BACKGROUND

This invention relates to electrical structural wiring elements including armored cables. Armored cables typically include a metal sheath enclosing one or more individually insulated conductors. The sheath may be formed of a helically interlocked continuous strip of metal, or of smooth or corrugated continuous metal tubing. The construction of an armored cable sheath is well known in the art.

Armored cable is used in wiring homes and commercial buildings. During installation, appropriate lengths of armored cable are cut from a main supply (e.g., a spool, coil, or reel) and pulled or routed through the walls and ceilings of the building.

It is desirable in certain applications to maintain an uninterrupted conductive path along the metal sheath from one end of the cable to the other. During installation, each end of the armored cable is typically connected to a metal terminal box using a metal connector or a plastic connector with a metal pathway that connects the armor to the box. The metal of the connector touches both the exterior of the metal sheath and the terminal box, and thus provides an electrical path from sheath to ground.

Armored cable permits orderly wiring for various applications within a building (e.g., fire protection devices, healthcare, lighting). For example, wires of different sizes serving different applications may be grouped within different armored cables. Because the cables typically are installed near to each other, and because the cables look identical or similar, it is difficult to distinguish the different cables which serve different applications.

There is therefore a need for a visually distinctive guise for armored cable sheaths. With a visually distinctive guise, one would be able to distinguish certain wires from others by visual indicia. However, in applicable circumstances, the visual indicia must not jeopardize the desired conductivity characteristics of the sheath such that the sheath may still be used to ground voltage.

Visually distinctive armored cables have great application during urgent scenarios where time is of the essence; for example a building fire. One could easily determine the purpose of each armored cable and act accordingly without the need to electrically probe each wire or check schematics/building blueprints.

Examples of identifiable armored cables are available in prior art, however they are subject to a number of deficiencies. In some applications, they do not maintain desired conductivity characteristics as the entire armored sheath is applied with visual indicia with no exposed metal to allow for electrical grounding. Another deficiency, seen in separate prior art, is that the interval used for visual indicia is not consistent throughout the entire length of the cable. This becomes significant in scenarios where walls are breached to gain access to the armored cables; at the specific breach of the wall, there may not be any visual indicia to identify the type of cable as the identification is not consistent at every point along the cable.

With these deficiencies in mind, it is apparent that there is a need, not just for visually distinctive armored cable sheaths, but visually distinctive armored cable sheaths which have consistent indicia throughout the length of the cable, maintain conductivity, and add visual indicia efficiently.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

In accordance with an aspect of the present invention, there is provided an identifiable armored cable sheath comprising: an armored cable sheath having an outer surface, and visual indicia applied on the outer surface of the cable sheath in a patterned arrangement, wherein the visual indicia is distinct from the armored cable sheath, and wherein the visual indicia includes material which is visible in low light.

In accordance with another aspect of the present invention, there is provided an identifiable armored cable sheath comprising: an armored cable sheath having an outer surface, and a visual indicia applied on the outer surface of the cable sheath in a patterned arrangement, wherein the visual indicia possesses visibility features in low light.

In accordance with another aspect of the present invention, there is provided a method of making an identifiable armored cable sheath comprising: providing an armored cable sheath, and applying a visually distinctive tape to the outer surface of the sheath in a patterned arrangement.

In accordance with another aspect of the present invention, there is provided a visually identifiable electrical structural system comprising: material which is visible in low light comprising luminescent, fluorescent, and/or UV-visible materials applied to an electrical structural element selected from the group consisting of electrical boxes, electrical switches, pull-stations, breaker boxes, electric meters, hydro meters, energy meters, and/or any combination thereof.

BRIEF DESCRIPTION OF THE FIGURES

FIG. 1 provides exemplary conductivity characteristics for an armored cable sheath;

DETAILED DESCRIPTION OF THE INVENTION

Definitions

As used herein, the term "about" refers to a +/−10% variation from the nominal value. It is to be understood that such a variation is always included in a given value provided herein, whether or not it is specifically referred to.

Unless defined otherwise, all technical and scientific terms used herein have the same meaning as commonly understood by one of ordinary skill in the art to which this invention belongs.

The present invention provides an identifiable armored cable sheath and a method of making an identifiable armored cable sheath comprising an armored cable sheath having an outer surface, and tape applied on the outer surface of the armoured cable sheath in a patterned arrangement. Additionally, the visual indicia is further described comprising ink, dye, powder, paint, or any combination thereof which contain visibility features in low light.

Armored Cable Sheath

The present invention may utilize any variety of armored cable sheath. In applications where the sheath is utilized as an electrical ground, the properties of the sheath must comply with provided conductivity characteristics throughout the entire length of the sheath set out in the table in FIG. 71. For example, if American Wire Gauge (AWG) size of the armored cable is 10, the corresponding maximum resistance per 100 feet is 0.56 Ohms. This table reflects the conductivity characteristics which should be preserved after application of visual indicia to the armored cable.

Figure 2:
FIG. 2 illustrates an armored cable sheath with a flexible helical coiled sheath.

In one embodiment, the sheath is formed of a helically interlocked continuous strip of metal as shown in FIG. 2. This design promotes flexibility of the sheath and may be adapted for a multitude of non-linear armored cable applications.

Figure 3:
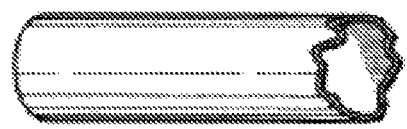
FIG. 3 illustrates an armored cable sheath with smooth tubing.

In one embodiment, the sheath is formed of smooth metal tubing as shown in FIG. 3. This design promotes cost-effectiveness and is ideal for pre-planned application where there is little need for flexible armored cable.

Figure 4:
FIG. 4 illustrates an armored cable sheath with corrugated tubing.

In one embodiment, the sheath is corrugated continuous metal tubing as shown in FIG. 4.

The material used for the sheath may comprise a variety of materials. For metallic materials that provide desired continuous conductivity characteristics, the required resistance requirements are set out in FIG. 71. In one embodiment, the sheath is constructed from aluminum. In one embodiment, the sheath is constructed from steel. In one embodiment, the sheath is constructed from copper. In one embodiment, the sheath is constructed from brass.

The sheath may be constructed from non-metallic materials such as, but not limited to, plastics, rubbers, and/or ceramics.

Visual Indicia Application

In some embodiments, visual indicia are applied to the outer surface of the cable sheath. This may include, but is not limited to, application of ink, dye, powder, paint, tape, or any combination thereof.

The indicia is applied to be distinct from the armored cable sheath to provide a visual distinction such that an individual can identify the type of armored cable used and the application of that particular cable using purely sight. Therefore, the use of color to represent the type of cable, and application of cable is implemented.

Where appropriate, the distinct colors of the visual indicia used correspond to industry standards, for example the UL (Underwriters Laboratories) standards utilized in the United States, and the CSA (Canadian Standards Association) utilized in Canada.

In preferred embodiments, fluorescent, luminescent, and/or UV-visible material in the tape are utilized such that the armored cable may be identified in low light settings such as during power outages.

In some embodiments, the visual indicia may be applied to various utility housing and emergency equipment related to electrical structural wiring. Equipment may include, but is not limited to, electrical boxes, electrical switches, pull-stations, breaker boxes, electric meters, hydro meters, energy meters, and/or any combination thereof. This is particularly useful in situations where power outages occur and emergency and power equipment are still identifiable in low-light environments to assist persons in locating the correct resources (i.e. fire alarm pull station).

In preferred embodiments, the visual indicia applied to a metallic armored cable sheath with electrical grounding functionality has a width that, upon application, a portion of the sheath remains exposed to allow for continuous conductivity throughout the length of the armored cable. Exemplary conductivity characteristics are as set out in FIG. 71.

Figure 5:
FIG. 5 illustrates an armored cable sheath with a flexible helical coiled sheath, with a helical patterning arrangement.
Figure 6:
FIG. 6 illustrates an armored cable sheath with a flexible helical coiled sheath, with a reverse helical patterning arrangement.
Figure 7:
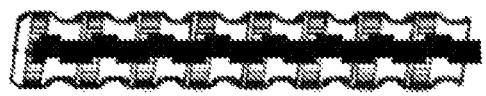
FIG. 7 illustrates an armored cable sheath with a flexible helical coiled sheath, with a longitudinal patterning arrangement.

The patterning of specific visual indicia may take any form. In a metallic sheath which desires electric grounding capability, the patterning allows for continuous conductivity requirements, as shown in FIG. 71, along the entire length of the cable. In one embodiment, the arrangement of the visual indicia may be a helical pattern relative to the cable sheath; one example of which is shown in FIG. 5. In one embodiment, the arrangement of the visual indicia is a reverse helical pattern relative to the cable sheath; one example of which is shown in FIG. 6. In one embodiment, the arrangement of the visual indicia is longitudinal relative to the cable sheath; one example of which is shown in FIG. 7.

Visually Distinctive Tape

In some embodiments, the visual indicia are provided by application of a visually distinctive tape to the outer surface of the cable sheath to give a distinct appearance from the armored cable.

In one embodiment, the tape applied has self-adhesive properties without need for extraneous bonding mechanisms. In one embodiment, the tape applied requires extraneous treatment, for example, in a heat chamber, or application of an adhesive agent to assist adherence to the armored cable sheath.

Visual indicia can be provided on the tape through a number of mechanisms. In one embodiment, the tape is coated with ink. In one embodiment, the tape is impregnated with dye. In one embodiment, the tape is coated with paint. In one embodiment, the tape is coated with powder.

In one embodiment, the visual indicia comprises printed information applied on the tape. The tape may undergo a printing process using conventional printing techniques to apply different patterns, words, colors, information to the tape prior to application. Examples of information applied include, but are not limited to, company information, color legend, armor cable type, armor cable model line, and/or industry standards (e.g. UL number, CSA number). In one embodiment of printed tape, the tape itself may have no color, but information printed in color on the tape provides the visual indicia. In one embodiment, the printed tape may contain printed color and printed information.

A few of the benefits of using printed tape as a form for visual cable indicia, include ease of application and cost-efficiency. Firstly, the application of the information is more easily accomplished by printing the information onto tape and applying the printed tape onto the cable sheath than applying paint or dye directly onto the cable sheath. Conventional industrial printers are fully compatible with tape allowing for efficient application. Secondly, the cost of applying the information to tape prior to subsequent application may be less than other mechanisms such as applying paint directly to the cable sheath which requires specialized precision machinery.

Some embodiments utilize fluorescent, luminescent, and/or UV-visible material in the tape such that the armored cable may be identified in low light settings such as during power outages.

In one embodiment, the tape is a composite tape comprised of at least two layers adhered together.

In one embodiment, the composite tape is formed of two layers. In a preferred embodiment, the first layer is a polyester film which forms the outer layer of the composite tape, and the underlying layer is an ethylene acrylic acid (EAA) copolymer film. In such an embodiment, the visual indicia are provided on the polyester film layer by the application of paint. The paint is applied to the film by conventional paint application mechanisms known in the art. The EAA film provides strong adhesion to the armored cable sheath due to its intrinsic composition as it bonds stronger to metallic surfaces than non-metallic surfaces.

The top layer and bottom layer may be of distinct compositions. In one embodiment, the bottom layer will be void of visual indicia, while the top layer will be applied with the visual indicia. In one embodiment, the top layer will be void of visual indicia, while the bottom layer will be applied with visual indicia. In one embodiment, both layers will have visual indicia applied.

In metallic applications where conductivity is required, the tape applied to the armored cable sheath has a width such that, upon application, a portion of the sheath remains exposed to allow for continuous conductivity throughout the length of the armored cable. Exemplary conductivity characteristics are set out in FIG. 71.

Tape Patterning and Application

The patterned arrangement of the tape may be of any design. In metallic applications where conductivity is required, the patterning allows for continuous conductivity requirement along the entire length of the cable. Exemplary conductivity characteristics are measured by a maximum allowable resistance which are set out in FIG. 71. The patterned arrangement of the tape is applied along the length of the armored cable.

In one embodiment the patterned arrangement of tape is helically wrapped, relative to the cable sheath, along the outer surface of the armored cable sheath as displayed in FIG. 5. In one embodiment the patterned arrangement of tape is reverse helically wound, relative to the cable sheath, along the outer surface of the armored cable sheath as shown in FIG. 6. In one embodiment the patterned arrangement of tape is longitudinally arranged relative to the cable sheath, as shown in FIG. 7.

The patterned arrangement of the tape on the armored cable sheath may be applied by conventional equipment used for tape application.

In conventional tape application machinery, the tape is wrapped around the cable as the cable is pulled through the tape applicator. This may include, but is not limited to, layer-wound, pancake type, reverse wound, and traverse wound mechanisms. The tape application machinery wraps the tape at an adjusted setting through tension regulation devices. Tape packages can be concentric where the cable travels through the center of the tape pad, or eccentric where tape packages are rotated about the cable. The tape wrapping application is done in close control with the cable pulling function (dictated by speed).

In one embodiment, after the cable sheath has been wrapped in tape, the wrapped cable sheath is inserted into a heated chamber in order to assist adhesion to the metallic outer surface of the armored cable. In such an embodiment, heating is used to help the tape to adhere to the metallic surface. Such a heating step is particularly useful for tapes without any innate adhesive properties under normal room temperature, for example, tapes having "shrink wrap" characteristics.

In one embodiment, the chamber is heated to a temperature from about 50° C. to about 200° C. In one embodiment, the chamber is heated to a temperature from about 70° C. to about 130° C. In one embodiment, the chamber is heated to a temperature from about 80° C. to about 120° C. In one embodiment, the chamber is heated to a temperature from about 90° C. to about 110° C.

In one embodiment, the heated chamber employs re-circulated air to maintain the required temperature. In one embodiment, the temperature may be reduced while duration of exposure may increase. In one embodiment, conventional heating systems known in the art may provide the necessary temperature to aid adhesion.

In some embodiments, the tape used for application is compatible with residual oil presence on the helical coiled armored sheath. Such residual oil may be present as a manufacturing by-product during production of the helical coiled armored sheaths.

The invention will now be described with reference to specific examples. It will be understood that the following examples are intended to describe embodiments of the invention and are not intended to limit the invention in any way.

EXAMPLES

Example 1: Armored Cable with Visual Indicia

This example provides an armored cable with visual indicia suitable for fire alarm application.

The cable sheath is constructed of aluminum and is a helically interlocked continuous strip of metal seen in FIG. 2.

The tape used for the armored cable sheath is a compound tape with general width of 0.5 inches to 0.75 inches. The top layer of the compound tape, which provides the distinct visual indicia, is a polyester film with thickness of approximately 0.00092 inches. The bottom layer of the compound tape, which adheres to the metal sheath, is an ethyl acetoacetate film with thickness 0.0007 inches. The tape is compatible with maintaining an adhesive bond with the residual oil which remains on the outer shell of the armored cable sheath.

The top layer of the compound tape is combined with a mixture of red ink and luminescent materials to give the top layer of the compound tape reddish visual indicia consistent with UL and CSA standards utilized in the United States and Canada regarding fire-alarm/emergency related cables.

The tape is then applied to the armored cable sheath by means of a conventional mechanical tape applicator. The patterned arrangement of the tape follows a reverse round helical pattern with the tape helically wound at the opposite angle of the wind of the aluminum sheath seen in FIG. 6. The entire length of the armored cable sheath is applied with this patterned arrangement of tape.

The armored cable sheath is then input into a heating chamber, with re-circulated air, at a temperature of 150° C. for 2 minutes. The heat shrink-wraps the tape and bonds the bottom ethyl acetoacetate layer to the aluminum.

The armored cable sheath is then removed from the heated chamber with full adhesion of the tape to the outer surface of the sheath.

It is obvious that the foregoing embodiments of the invention are examples and can be varied in many ways. Such present or future variations are not to be regarded as a departure from the spirit and scope of the invention, and all such modifications as would be obvious to one skilled in the art are intended to be included within the scope of the following claims.

We claim:

1. An identifiable armored cable sheath comprising:
   an armored cable sheath having an outer surface, and tape applied on the outer surface of the cable sheath, and wherein the tape is visually distinctive from the armored cable sheath, wherein the tape is a composite tape comprising at least two layers of film, and wherein the composite tape comprises an outer polyester film and an inner ethylene acrylic acid copolymer film.

2. The armored cable sheath of claim 1, wherein the tape is a distinct color.

3. The armored cable sheath of claim 1, wherein the tape includes printed information.

4. The armored cable sheath of claim 1, wherein the tape comprises luminescent, fluorescent, and/or UV-visible materials.

5. The armored cable sheath of claim 1, wherein the polyester film comprises visual indicia.

6. The armored cable sheath of claim 1, wherein the tape is helically wound relative to the armored cable sheath or reverse helically wound relative to the armored cable sheath.

7. The armored cable sheath of claim 1, wherein the tape is applied along the length of the armored cable sheath.

8. The armored cable sheath of claim 1, wherein the tape applied on the outer surface of the cable sheath is in a patterned arrangement.

9. The armored cable sheath defined in claim 8, wherein the sheath is formed of a metallic material and wherein the pattern provides an exposed portion of the metallic sheath to maintain electrical grounding functionality throughout the entire sheath.

10. An identifiable armored cable comprising an armored cable sheath having an outer surface, and tape applied on the outer surface of the cable sheath and wherein the tape is visually distinctive from the armored cable sheath, wherein the tape is a composite tape comprising at least two layers of film, and wherein the composite tape comprises an outer polyester film and an inner ethylene acrylic acid copolymer film.

11. The armored cable of claim 10, wherein the tape is a distinct color.

12. The armored cable of claim 10, wherein the tape includes printed information.

13. The armored cable of claim 10, wherein the tape comprises luminescent, fluorescent, and/or UV-visible materials.

14. The armored cable of claim 10, wherein the polyester film comprises visual indicia.

15. The armored cable of claim 10, wherein the tape is helically wound relative to the armored cable sheath or reverse helically wound relative to the armored cable sheath.

16. The armored cable of claim 10, wherein the tape is applied along the length of the armored cable sheath.

17. The armored cable of claim 10, wherein the tape applied on the outer surface of the cable sheath is in a patterned arrangement.

18. The armored cable of claim 10, wherein the sheath is formed of a metallic material and wherein the pattern provides an exposed portion of the metallic sheath to maintain electrical grounding functionality throughout the entire sheath.

* * * * *